Oct. 5, 1971    L. O. HEWKO    3,610,060

FRICTION DRIVE MECHANISM

Filed May 21, 1970    2 Sheets-Sheet 1

INVENTOR.
Lubomyr O. Hewko
BY
John P. Moran
ATTORNEY

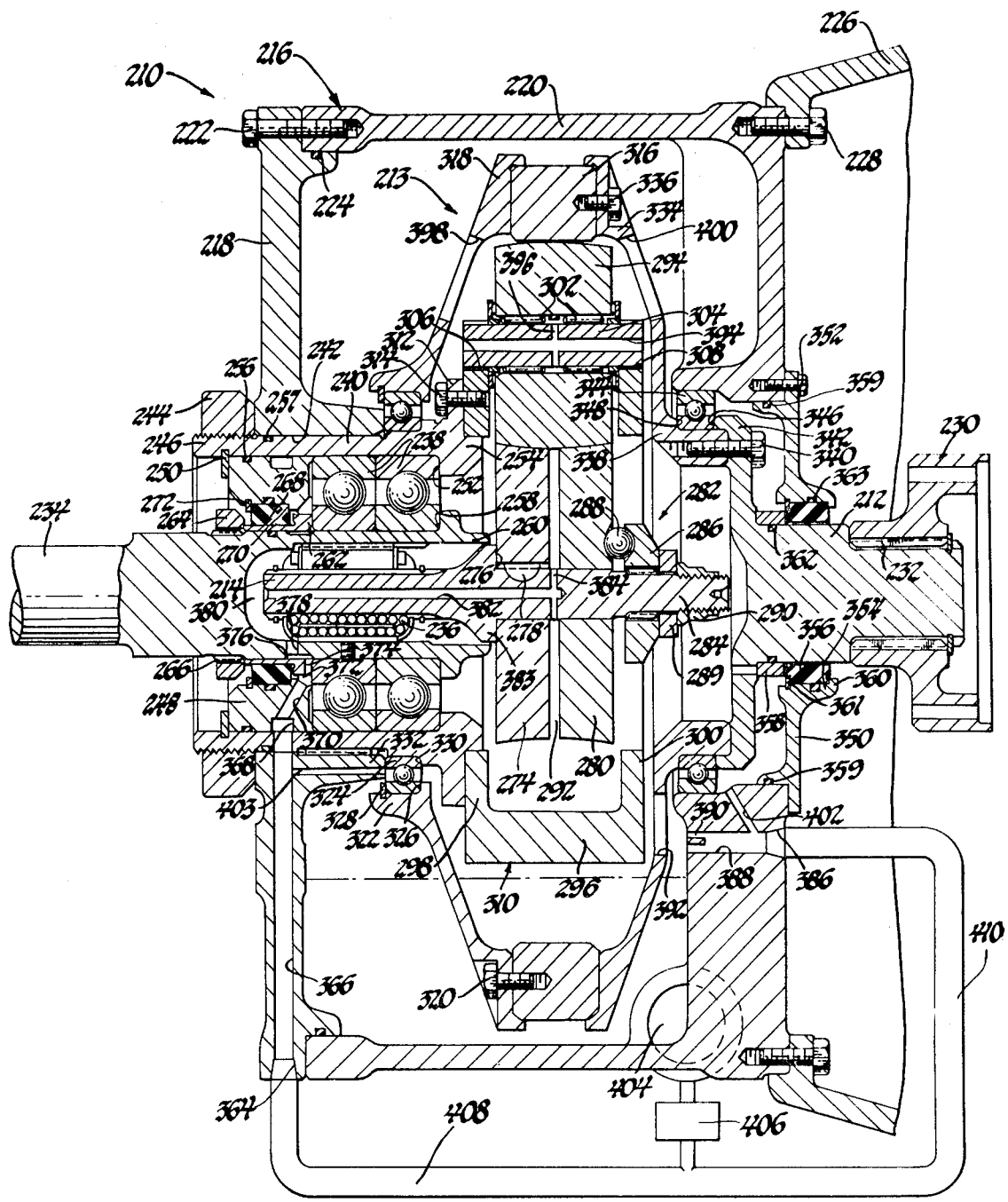

United States Patent Office 3,610,060
Patented Oct. 5, 1971

3,610,060
FRICTION DRIVE MECHANISM
Lubomyr O. Hewko, Port Clinton, Ohio, assignor to
General Motors Corporation, Detroit, Mich.
Filed May 21, 1970, Ser. No. 39,271
Int. Cl. F16h 13/02; F16n 7/26
U.S. Cl. 74—208
10 Claims

ABSTRACT OF THE DISCLOSURE

A friction drive mechanism including a housing, input and output shafts, spaced-apart inner sun members mounted on one of said shafts, an outer ring member, a fixed carrier member intermediate the ring and sun members rotatably supporting barrel-type planet pinions frictionally contacting both the ring and sun members, a flange member interconnected between the ring member and one of the shafts, and a lubrication system for providing lubricant to the bearing supports and to all contacting surfaces, particularly accomplishing the cooling of the sun members which, generally, become the hottest components of the planetary unit, with the rotating ring and flange members serving as an impeller for pumping the fluid therefrom, through a cooler and back to the fluid inlet of the friction drive mechanism for recirculation therethrough.

---

This invention relates to friction drive mechanisms and more particularly to improved planetary units therefor.

The invention embodies a friction drive mechanism including an improved lubrication system, wherein the outer ring and flange member leading therefrom to an input or output shaft may serve as an impeller for pumping fluid out of the main housing, through a cooler, and back to the inlet of the housing.

An object of the invention is to provide a planetary unit embodying an improved lubrication arrangement for lubricating the support bearings and other moving and rotating parts of the planetary unit.

Another object is to provide a lubrication arrangement which provides for the direct cooling of the sun members which generally become the hottest components during operation of the friction drive mechanism.

A further object is to provide an improved lubrication arrangement wherein a conduitry system supplies lubricant to the support bearings and the contacting surfaces between the planetary pinions and the sun members and between the planetary pinions and the ring member, while one or more flange members is connected between the ring member and a rotating shaft and serve as an impeller to recirculate fluid back to the inlet of the conduitry system.

These and other objects and advantages of the invention will become apparent when reference is made to the following description and accompanying drawings, wherein:

FIG. 3 is a cross-sectional view of a friction drive mechanism embodying a modification of the invention.

Figure 1:
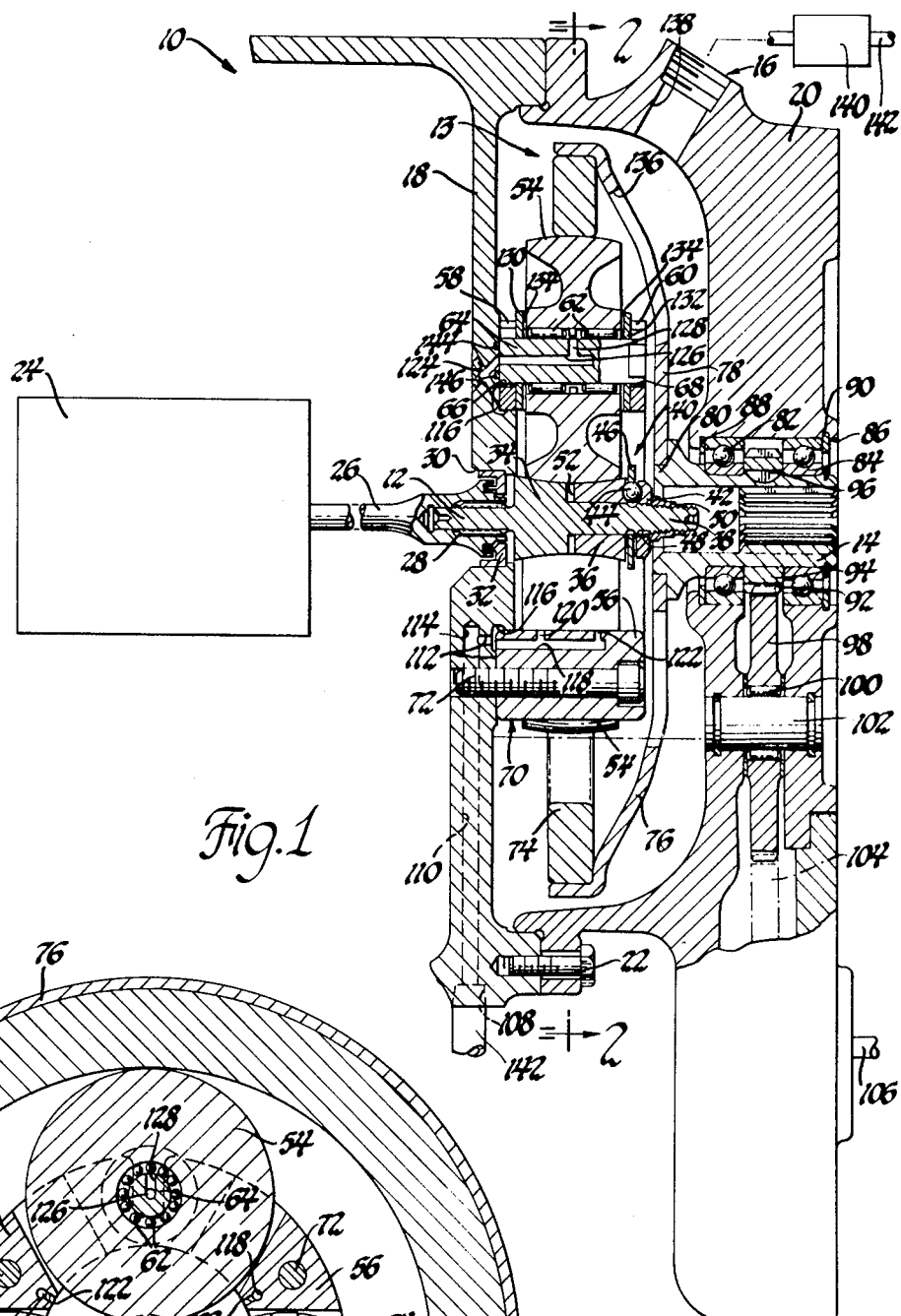
FIG. 1 is a cross-sectional view of a power-transmitting friction drive mechanism embodying the invention.

Referring now to the drawings in greater detail, FIG. 1 illustrates a friction drive mechanism 10 having an input shaft 12, a planetary unit 13 and an output shaft 14 mounted in a two-piece housing 16, wherein a cover member 18 is secured to the housing body 20 by bolts 22.

The input shaft 12 is driven by a suitable prime mover, such as a gas turbine engine, represented by 24, a drive shaft 26 thereof being connected to the input shaft 12 by splines 28. The combined shafts 12 and 26 extend into the housing 16 through an inlet opening 30 formed in the end cover 18, wherein the drive shaft 26 is surrounded by a suitable seal 32.

A first sun member 34 is formed as an integral part of the input shaft 12 at an intermediate portion thereof. A second sun member 36 is slidably and rotatably mounted on the right-hand extension 38 of the input shaft 12, the first and second sun members serving as cooperating spaced-apart halves. A torque loader mechanism 40 is mounted on the shaft extension 38 adjacent the outer face of the second sun member 36. The torque loader mechanism 40 includes a ball ramp member 42, a plurality of balls 44 and a ball retainer 46, the balls 44 being confined axially between oppositely disposed, irregular ramp surfaces formed on both the ramp member 42 and on the outer face of the movable sun member 36 and being restrained from radial movement by the retainer 46. The ramp member 42 is secured to the shaft extension 38 by splines 48 and restricted from moving to the right in FIG. 1 by a retainer 50 threadedly mounted on the end of the shaft extension 38.

The sun members 34 and 36 are separated by a space 52, the width of which is varied by the torque loader mechanism 40 in response to the torque applied to the planetary unit 13. The sun members 34 and 36 are contoured along their outer peripheries to accommodate being rollingly contacted by a plurality of barrel-type planet pinions 54 equally spaced therearound and separated by ribs 56 (FIG. 2) extending between carrier-end discs 58 and 60. The planet pinions 54 may have their side faces scalloped out to reduce stiffness and are rotatably mounted on needle bearings 62 which, in turn, are rotatably mounted on shafts 64, the latter extending between elongated slots 66 and 68 formed in the carrier-end discs 58 and 60, respectively. The end discs 58 and 60 and the interconnecting ribs 56 constitute a carrier 70 which is secured to the cover member 18 by bolts 72 extending longitudinally through the ribs 56.

A ring member 74 is rotatably mounted around the planet pinions 54. A flange member 76 is secured to the ring member 74 for rotation therewith and includes a center or hub portion 78 which is secured in any suitable manner, such as by brazing, to an internal end 80 of the output shaft 14. The entire planetary unit 13, including the sun members 34 and 36, planet pinions 54, ring member 74, flange member 76, as well as the input shaft 12 and the output shaft 14, is rotatably supported within the housing body 20 by means of bearings 82 and 84 which are confined axially in an outlet opening 86 by retainer rings 88 and 90.

It is apparent that the drive sequence for the drive mechanism 10 is via the input shafts 26 and 12 to the sun members 34 and 36, which rotate the planet pinions 54 on their stationary shafts 64. The planet pinions, in turn, rotate the ring member 74, the flange member 76 and the output shaft 14. Inasmuch as the carrier 70 is stationary, the output/input speed reduction ratio is the ratio of the sun members 34, 36 diameter to the diameter of the ring member 74.

Insofar as the operation relative to the torque loader mechanism 40 is concerned, any increase in torque will initially cause the sun member 36 to rotate slightly relative to the shaft extension 38. The balls 44 will thereupon move up on the oppositely disposed ramps, causing the sun member 36 to move axially toward the sun member 34, the shaft 12 being moved axially on the splines 28 relative to the housing 16 by virtue of the ramp member 42 being moved to the right by the balls 44. The now closer together sun members 34 and 36 will tend to force the planet pinions 54 radially outwardly in the enlongated slots 66 and 68 formed in the carrier 70, producing an increased force between the planet pinions 54 and the ring member 74 substantially equal to that between the planet pinions 54 and the sun members 34 and 36. As indicated, the retainer 46 will prevent the balls 44 from radial outward movement while they move along the ramps resulting from the centrifugal effect thereon.

While the output shaft 14 constitutes the main output, it may be noted in FIG. 1 that splines or gear teeth 92 are formed on a sleeve member 94 between the bearings 82 and 84, the sleeve member 94 being secured to the output shaft 14 by means of a key 96. A gear 98, rotatably mounted by needle bearings 100 on a shaft 102, meshes with the gear teeth 92. The gear 98, in turn, drives a mating gear 104 which may be used to rotate a second output shaft 106 as an additional power takeoff source for driving engine accessories and the like.

LUBRICATION SYSTEM

Figure 2:
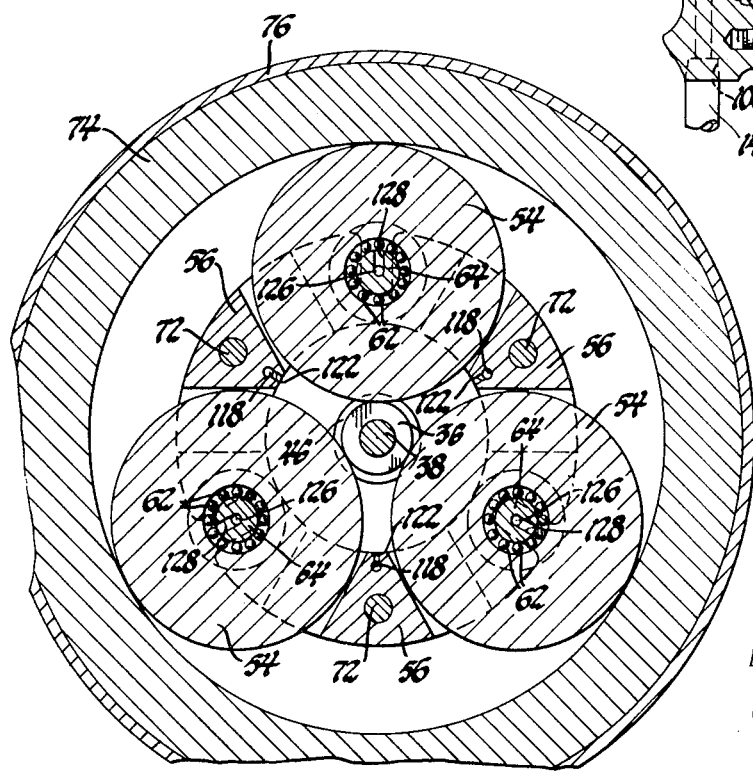
FIG. 2 is a cross-sectional view taken along the plane of line 2—2 of FIG. 1, as if FIG. 1 were a full round view, and looking in the direction of the arrows.

The lubrication system for the friction drive mechanism 10 includes an inlet port 108 and a radial passage 110 formed in the end cover 18 for the entrance of lubricating fluid. A longitudinal port 112 communicates between the innermost end 114 of the passage 110 and an annular passage 116 formed in the end cover 18 adjacent the forward face of the carrier 70. A longitudinal passage 118 extends through the end disc 58 and partially through each rib 56, communicating at its left end (FIG. 1) with the annular passage 116. A pair of radial passages 120 and 122 communicate the fluid from the longitudinal passage 118 to the radially innermost surface of each rib 56. This serves to permit the lubricating fluid or coolant to be projected onto the contacting surfaces between the sun members 34 and 36 and the planet pinions 54 during rotation of the ribs 56 (FIG. 2). This is important because the sun members 34 and 36 generally become the hottest members during operation of the friction drive mechanism 10.

A passage 124, which may consist of interconnecting, angled drilled and plugged holes, is formed in the cover member 18 and communicates the fluid from the annular passage 116 to an axial passage 126 formed in each pinion shaft 64. A radial passage 128 communicates the fluid from the axial passage 126 to the needle bearings 62 on which the planet pinions 54 rotate. Thrust bearings 130 and 132, adjacent the end faces of the planet pinions 54 and the carrier-end discs 58 and 60, respectively, each include radial slots 134 formed therein to permit the lubricating fluid to flow therefrom and be projected under the action of centrifugal force to the contacting surfaces between the planet pinions 54 and the ring 74 prior to exiting through large openings 136 formed in the output flange 76 and thence through a discharge outlet 138.

The rotating ring and flange members 74 and 76 may serve as an impeller which pumps oil from within the housing 16 through the discharge outlet 138 to a heat exchanger or cooler 140 and thence, under the pressure provided by the impeller, back to the inlet port 108 via a line 142, thereby eliminating the need for an external pump. However, for particular applications and/or when the ring and flange members 74 and 76 are the output members, it may be desirable to supplement the pumping action of the ring-flange impeller with an external pump.

An O-ring seal 144, mounted in a groove 146 formed on the inside surface of the cover member 18, serves to prevent leakage of the lubricant between the cover member 18 and the ends of the planet pinion shafts 64. The resultant pressurizing of the lubricating fluid by such seal 144 is important, particularly when the friction drive mechanism 10 is used with a high-speed, heavy-load turbine drive application.

FIG. 3 EMBODIMENT

This embodiment, which is more adaptable for a lower speed, lighter load application than that of the FIG. 1 structure, is generally similar to the friction drive mechanism 10, except for the direction of drive, the mounting arrangement and the lubrication system. As illustrated, a friction drive mechanism 210 includes an input shaft 212, a planetary unit 213, and a driven shaft 214 mounted in a two-piece housing 216, wherein a cover member 218 is secured to the housing body 220 by bolts 222. An O-ring seal 224 prevents leakage between the cover 218 and the body 220. The housing body 220 may be secured to a motor adaptor housing 226 by bolts 228.

The input shaft 212 is driven by a suitable prime mover, not shown, but which may be similar to the gas turbine engine 24 of FIG. 1. An input coupling flange 230, extending from the prime mover, is connected to the input shaft 212 by splines 232. A suitable output shaft 234 is connected by a ball-type spline arrangement 236 to the driven shaft 214. The combined shafts 214 and 234 are rotatably supported in bearings 238 which, in turn are confined within a cylindrical member 240 mounted in an opening 242 formed in the cover member 218. The member 240 is restrained axially in the opening 242 by a nut 244 threadedly mounted on the outer threaded end 246 of the member 240 and abutted against the cover member 218.

The output shaft 234 and the bearings 238 are restrained axially as follows. A spacer member 248 is abutted against the end face of one bearing 238 and confined at its other end by a retainer ring 250. The other bearing 238 abuts against the first bearing 238 and against a shoulder 252 formed on the inside surface of the innermost end 254 of the cylindrical member 240. O-ring seals 256 and 257 are mounted between the outer surface of the spacer member 248 and the inner surface of the member 246, and between the outer surface of the member 246 and the opening 242, respectively. The bearings 238, in turn, help restrain the output shaft 234 axially by virtue of being confined between an abutment 258 formed on the outer surface of the innermost end 260 of the output shaft 234 and a sleeve member 262, the latter abutting at its other end against a member 264 mounted on splines 266 on the output shaft 234. A seal arrangement 268 is confined between a shoulder 270 formed on the spacer member 248 and a retainer ring 272 mounted in a groove formed on the inner surface of the spacer member 248.

A first sun member half 274 is mounted adjacent a shoulder 276 formed at an intermediate point on the drive shaft 214 and is secured thereon by a key 278. A second sun member half 280 is located to the right (FIG. 3) of the first sun member 274 and is slidably and rotatably mounted on the shaft 214. A torque loader mechanism 282 is mounted on the threaded right-hand end 284 (FIG. 3) of the drive shaft 214 adjacent the outer face of the second sun member half 280. The torque loader mechanism 282 includes a ball ramp member 286 and a plurality of balls 288, the balls 288 being confined between oppositely disposed, irregular ramp surfaces formed on the ramp member 286 and on the outer face of the fixed sun member half 280. The ball ramp member 286 is spline-mounted on the threaded end 284 and prevented from becoming loose thereon by a nut 289 and a retainer 290 both threadedly mounted on the end 284 of the shaft 214.

The sun member halves 274 and 280 are separated by a space 292, the width of which is varied by the torque loader mechanism 282 in response to the torque applied to the planetary unit 213. The sun members 274 and 280 are contoured along their outer peripheries to accommodate being rollingly contacted by a plurality of barrel-type planet pinions 294 equally spaced therearound and separated by ribs 296 extending between carrier-end discs 298 and 300. The planet pinions 294 are rotatably mounted on needle bearings 302 which, in turn, are rotatably mounted on pinion shafts 304, the latter extending between elongated slots 306 and 308 formed in the carrier-end discs 298 and 300, respectively. The end discs 298 and 300 and the interconnecting ribs 296 comprise a carrier 310 which is secured to a flange 312 formed on the inner end of the cylindrical member 240 by bolts 314.

A ring member 316 is rotatably mounted around the planet pinions 294. A first flange member 318 is secured by bolts 320 to the left face (FIG. 3) of the ring member 316 for rotation therewith and includes a central hub portion 322 which is rotatably mounted on bearings 324. The bearings 324, in turn, are mounted on the cylindrical member 240 and serve to help restrain the flange member 318 and the ring 316 axially by virtue of being confined at the outer edges by a shoulder 326 formed on the hub portion 322 and a retainer ring 328 mounted in a groove formed in the hub portion 322, and at its inner edges between a shoulder 330 formed on the cylindrical member 240 and a hub 332 extending inwardly from the cover member 218.

A second flange member 334 is secured by bolts 336 to the right face (FIG. 3) of the ring member 316 for rotation therewith and includes a central hub portion 338 which is secured by bolts 340 to a flange 342 formed on the inner end of the input shaft 212. The hub portion 338 of the flange member 334 is rotatably mounted on bearings 344 which are rotatably confined between an edge 346 of the flange 342 and a shoulder 348 formed on the flange member 334. A connector member 350 is secured to the housing 220 by bolts 352. A face seal 356 is mounted in the hub portion 354 of the member 350, adjacent a cooperating spacer member 358, the latter being mounted for rotation with the shaft 212. An O-ring seal 359 is mounted between the housing 220 and the connector member 350. The face seal member 356 is confined between a lip 360 formed on the hub portion 354 and a retainer ring 361 mounted in a groove formed in the hub portion 354. Inner and outer O-ring type seals 362 and 363, respectively, prevent leakage from the housing 216 past the input shaft 212.

It is apparent that the drive sequence is via the input shaft 212 to the flange member 334 and, thence, to the ring member 316. Inasmuch as the planet pinion shafts 304 are mounted on the stationary carrier 310, the ring member 316 will rotate the planet pinions 294 about their respective shafts 304. The planet pinions, in turn, will rotate the sun members 274 and 280 and the associated output shafts 214 and 234. Inasmuch as the carrier 310 is stationary, the output/input speed increase ratio is the ratio of the diameter of the ring member 316 to the diameter of the sun members 274 and 280.

Insofar as the operation relative to the torque loader mechanism 282 is concerned, any increase in torque will initially cause the sun member 280 to rotate slightly relative to the shaft extension 284. The balls 288 will thereupon move up on the oppositely disposed ramps, causing the sun member 280 to move axially toward the sun member 274, the shaft 214 being moved axially on the ball splines 236 relative to the housing 216 by virtue of the ramp member being moved to the right (FIG. 3) by the ball 288. The now closer together sun members 274 and 280 will tend to force the planet pinions 294 radially outwardly in the elongated slots 306 and 308 formed in the carrier 310, producing an increased pressure between the planet pinions 294 and the ring member 316 equal to that between the planet pinions 294 and the sun members 274 and 280.

While the drive sequences of the planetary units 13 and 213 are in opposite directions, it should be apparent that both units could have their "inputs" serve as "outputs" and vice versa, depending upon whether speed increase or speed reduction is desired.

FIG. 3 LUBRICATION SYSTEM

The lubrication system for the friction drive mechanism 210 includes an inlet port 364 and a radial passage 366 formed in the end cover 218 for the entrance of lubricating fluid. The radial passage 366 communicates with an annular passage 368 formed around the spacer member 248. An angled passage 370 communicates the fluid from the annular passage 368 to an annular pocket 372, also formed in the spacer member 248 adjacent the support bearing 238. A radial opening 374 is formed in the sleeve member 262, communicating the fluid from the annular pocket 372 to an annular undercut 376 formed around the output shaft 234. Radial passages 378 then communicate the fluid from the annular undercut 376 to a substantially closed chamber 380 in which the ball-type splines 236 are mounted for interconnecting the shafts 214 and 234. An axial passage 382 is formed partially through the drive shaft 214, communicating at the left end thereof (FIG. 3) with the chamber 380, which, being substantially closed by a flanged portion 383 of the shaft 214, forces the fluid into the passage 382. Radial passages 384 are formed in the shaft 214 transversely across the axial passage 382. The radial passages 384 are radially aligned with the space 292 between the sun members 274 and 280. Thus, lubricating fluid which has entered at the inlet port 364 will be provided between the opposing faces of the sun members 274 and 280, absorbing heat therefrom and continuing to flow through the space 292 radially outwardly to the contacting surfaces between the sun members 274 and 280 and the planet pinions 294.

A second fluid inlet port 386 is formed in the right-hand side (FIG. 3) of the housing body 220. A longitudinal passage 388 is formed through the wall of the housing body 220 between the inlet port 386 and an outlet jet 390. The outlet jet 390 is longitudinally aligned with a circle of openings 392 formed in the rotatable flange member 334. The openings 392 are on the same diameter as axial passages 394 formed through the planet pinion shafts 304. Radial passages 396 are formed in the planet pinion shafts 304, intermediate the ends thereof for communicating the fluid from the axial passages 394 to the needle bearings 302 on which the planet pinions 294 rotate. Lubricant fed via the routing just described will then flow across the outer faces of the planet pinions 294 under the action of centrifugal force to the contacting surfaces between the planet pinions 294 and the ring member 316. A plurality of openings 398 and 400 are formed in the flange members 318 and 334, respectively, permitting the lubricating fluid to exit therethrough.

Referring once again to the fluid inlet passages 388 and 366, respectively, it may be noted that an angled passage 402 is formed in the housing body 220 adjacent the second inlet port 386 and communicating between the longitudinal passage 388 and the bearings 344 on which the flange member 334 is rotatably mounted, and a transverse passage 403 is formed in the hub 332 of the cover member 218 communicating between the radial passage 366 and the bearings 324 on which the other flange member 318 is rotatably mounted.

The rotating flanges 318 and 334 and the intermediate ring member 316, rotating at input speeds, serve as an impeller which pumps oil from within the housing 216 through an oil drain 404 to a heat exchanger or cooler 406 and thence, under the pressure provided by the impeller, back to the two inlet ports 364 and 386 via lines 408 and 410, respectively, thereby eliminating the need for an external pump. If desired, paddle or fin members may be formed on one or both of the flange members 318 and 334, as well as on the flange member 76 of FIG. 1, to increase the pumping action thereof. For each of the friction drive mechanisms 10 and 210, the lubrication fluid levels, when the respective planetary units 13 and 213 are not rotating, are as illustrated in FIGS. 1 and 3, respectively, as being just below the bottom planet pinion.

It should be apparent that the invention provides an improved planetary unit arrangement including improved means for lubricating the internal bearings and other moving and rotating parts of the planetary unit, with a portion thereof serving as an impeller, eliminating the need for an external pump. The lubricating arrangement, in each instance, especially provides for the cooling of the sun members which generally become the hottest components during operation of the friction drive mechanism.

While but two embodiments of the invention have been shown and described, other modifications thereof are possible.

I claim:

1. A friction drive mechanism comprising a housing; input and output shafts; a planetary unit including a sun member mounted on one of said shafts, a ring member, a flange member extending between said ring member and the other of said shafts, a plurality of intermediate planet pinions in frictional contact with said sun and ring members and rotatably mounted on planet pinion shafts, and a fixed carrier for supporting said planet pinion shafts; and a lubrication system including inlet and outlet ports formed in said housing, a plurality of passages formed in said housing and in said planetary unit communicating between said inlet and outlet ports, and an external passage completing the circuit between said outlet and inlet ports, said rotating ring and flange members providing impeller means for circulating lubricant through said outlet port, said external passage and said plurality of passages.

2. The friction drive mechanism described in claim 1, and a cooler in said external passage.

3. The friction drive mechanism described in claim 1, wherein said sun member includes spaced-apart halves, and torque loader means operatively connected to one of said halves for varying the space between said halves and the pressure between said sun member halves and said planet pinions and between said planet pinions and said ring member in response to torque applied to said planetary unit.

4. The friction drive mechanism described in claim 1, wherein said plurality of passages includes a radially extending passage formed in said housing and communicating with said inlet port, an annular passage formed in said housing and communicating with said radially extending passage, an axial passage formed in each of said planet pinion shafts and communicating with said annular passage for supplying said lubricant to the contacting surfaces between said ring member and said planet pinions, a plurality of passages formed in said carrier and communicating with said annular passage for supplying said lubricant to the contacting surfaces between said sun members and said planet pinions, and a plurality of openings formed in said flange members for permitting the overflow of said lubricant to exit therethrough and to communicate with said outlet port.

5. The friction drive mechanism described in claim 3, wherein said plurality of passages includes a radially extending passage formed in said housing and communicating with said inlet port, an axial passage formed in said one of said shafts, a passage communicating between said radially extending passage and said axial passage, a transverse passage formed in said one of said shafts and communicating between said axial passage and said space between said sun member halves for passing said lubricant to said sun member halves and lubricating the contacting surfaces between said planet pinions and said sun member halves, an axial passage formed in each of said planet pinion shafts, a second inlet port formed in said housing, a first plurality of openings formed in said flange member aligned with said axial passages in said planet pinion shafts, a passage formed through the wall of said housing communicating with said second inlet port and aligned with said first plurality of openings, a jet mounted in said last-mentioned passage, and a second plurality of openings formed in said flange member for permitting the overflow of said lubricant to exit therethrough and communicate with said outlet port.

6. A friction drive mechanism comprising a housing, an input shaft, an output shaft, a speed-changing planetary unit connected intermediate said input and output shafts, said planetary unit including a sun member mounted on one of said shafts for rotation therewith, a ring member, a flange member operatively connected between said ring member and the other of said shafts, and a plurality of planet pinions frictionally contacting said sun and ring members, a fixed carrier member having a plurality of ribs alternately extended between said planet pinions, a plurality of planet pinion shafts mounted on said carrier member, bearing means mounted on each of said planet pinion shafts for rotatably supporting said planet pinions, and lubrication means including a conduitry system formed in said housing and said planetary unit for supplying fluid to said bearing means and to said contacting surfaces between said sun and planet pinion members and between said planet pinion and ring members, said ring member and said flange member serving as an impeller for recirculating said fluid through said conduitry system.

7. The friction drive mechanism described in claim 6, and second bearing means mounted in said housing and operatively connected to one of said input and output shafts for rotatably supporting said planetary unit in said housing.

8. The friction drive mechanism described in claim 6, wherein said conduitry system includes interconnecting passages formed in said housing, in said plurality of ribs and in said planet pinion shafts, and a plurality of openings formed in said flange member.

9. The friction drive mechanism described in claim 6 wherein said sun member includes a pair of spaced-apart halves and said conduitry system includes a first inlet port, a plurality of interconnecting passages formed in said housing, an axial passage formed in said one of said shafts, radial passages formed in said one of said shafts communicating between said axial passage and the space between said sun member halves, a second inlet port, a passage formed through the wall of said housing from said second inlet port, an axial passage formed in each of said planet pinions, a first plurality of openings formed in said flange member and rotatable past both said passages formed through said wall and said axial passages formed in said planet pinions, a second flange member connected to said ring member and rotatably mounted on said housing, a second and third plurality of openings formed in said first and second flanges, respectively, radially outwardly of said first plurality of openings.

10. The friction drive mechanism described in claim 6, wherein said sun member includes a pair of spaced-apart halves, one of said halves being fixed on said one of said shafts and the other of said halves being rotatably and slidably mounted on said one of said shafts, and a torque loader mechanism operatively connected to said rotatable and slidable sun member half for preventing slippage among said planetary unit members in response to increased torque on said planetary unit.

References Cited

UNITED STATES PATENTS

| | | | |
|---|---|---|---|
| 1,368,570 | 2/1921 | Philippeau | 74—208 |
| 2,127,588 | 8/1938 | Erban | 74—208 |

LEONARD HALL GERIN, Primary Examiner

U.S. Cl. X.R.

184—13 (R)